United States Patent
Mueller

(10) Patent No.: US 8,683,429 B2
(45) Date of Patent: Mar. 25, 2014

(54) SYSTEMS AND METHODS FOR RUNTIME CONTROL OF HIERARCHICAL OBJECTS

(75) Inventor: Eric J. Mueller, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1016 days.

(21) Appl. No.: 12/197,598

(22) Filed: Aug. 25, 2008

(65) Prior Publication Data

US 2013/0311969 A1    Nov. 21, 2013

(51) Int. Cl.
*G06F 9/44*    (2006.01)
*G06F 9/45*    (2006.01)

(52) U.S. Cl.
USPC ........... 717/108; 717/110; 717/116; 717/120; 717/165; 345/156; 345/473; 345/474; 345/475

(58) Field of Classification Search
None
See application file for complete search history.

(56) References Cited

U.S. PATENT DOCUMENTS

| | | | |
|---|---|---|---|
| 5,594,856 A | | 1/1997 | Girard |
| 5,764,241 A | | 6/1998 | Elliott et al. |
| 5,806,080 A | | 9/1998 | Purple et al. |
| 5,835,693 A | | 11/1998 | Lynch et al. |
| 5,889,528 A | | 3/1999 | Zhao |
| 5,889,532 A | | 3/1999 | Boucher et al. |
| 5,909,218 A | * | 6/1999 | Naka et al. ............. 345/419 |
| 5,982,389 A | | 11/1999 | Guenter et al. |
| 6,088,035 A | | 7/2000 | Sudarsky et al. |
| 6,111,590 A | | 8/2000 | Boezeman et al. |
| 6,141,019 A | * | 10/2000 | Roseborough et al. ....... 345/473 |
| 6,160,907 A | | 12/2000 | Robotham et al. |
| 6,191,798 B1 | | 2/2001 | Handelman et al. |
| 6,341,246 B1 | * | 1/2002 | Gerstenberger et al. ...... 700/245 |
| 6,380,941 B2 | | 4/2002 | Mochizuki et al. |
| 6,400,368 B1 | | 6/2002 | Laperriére |
| 6,462,742 B1 | * | 10/2002 | Rose et al. .................... 345/473 |
| 6,535,215 B1 | | 3/2003 | DeWitt et al. |
| 6,538,654 B1 | | 3/2003 | Rose et al. |
| 6,559,845 B1 | | 5/2003 | Harvill et al. |
| 6,563,504 B1 | | 5/2003 | Rose et al. |
| 6,738,065 B1 | | 5/2004 | Even-Zohar |
| 6,774,885 B1 | * | 8/2004 | Even-Zohar .................. 345/156 |
| 6,798,414 B2 | | 9/2004 | Ohto et al. |
| 6,822,653 B2 | | 11/2004 | Boyd et al. |
| 6,840,127 B2 | * | 1/2005 | Moran ....................... 74/490.04 |
| 6,924,803 B1 | | 8/2005 | Girling et al. |

(Continued)

OTHER PUBLICATIONS

Weber, "Run-Time Skin Deformation, In Preceedings of Game Developers Conference", Mar. 2000, pp. 1-19.*

(Continued)

*Primary Examiner* — Isaac Tecklu
(74) *Attorney, Agent, or Firm* — Kilpatrick Townsend & Stockton LLP

(57) ABSTRACT

Methods for runtime control of hierarchical objects are provided. Certain embodiments provide kinematics procedures in a media content, runtime environment. Making these procedures available in the runtime environment allows the variables of the kinematics procedures to be specified at runtime, for example by the end user or by a runtime-executed script. One exemplary method comprises receiving a hierarchical object for a piece of media in a media content authoring environment and providing the piece of media to one or more runtime environments. The piece of media provided to the runtime environments comprises both object information about the hierarchical object and kinematics procedural information for performing kinematics on the hierarchical object, such as procedural classes for performing inverse kinematics procedures based on runtime-provided end-effector and target point variables.

22 Claims, 3 Drawing Sheets

(56) References Cited

U.S. PATENT DOCUMENTS

| | | |
|---|---|---|
| 6,937,240 B2 | 8/2005 | Sasaki |
| 7,034,835 B2 | 4/2006 | Whatmough |
| 7,242,405 B2 | 7/2007 | Cohen et al. |
| 7,259,764 B2 | 8/2007 | Anderson |
| 7,420,544 B2 | 9/2008 | Ono et al. |
| 7,646,383 B1 | 1/2010 | Taylor |
| 7,859,538 B2 | 12/2010 | Isner et al. |
| 7,872,653 B2 | 1/2011 | Zhou et al. |
| 7,920,140 B2 | 4/2011 | Liepa et al. |
| 8,260,593 B2 | 9/2012 | Raschke |
| 2003/0034979 A1 | 2/2003 | Nakamura et al. |
| 2003/0090523 A1 | 5/2003 | Hayashi et al. |
| 2003/0146915 A1 | 8/2003 | Brook et al. |
| 2003/0234788 A1 | 12/2003 | Uesaki et al. |
| 2004/0106916 A1* | 6/2004 | Quaid et al. ............ 606/1 |
| 2004/0149065 A1* | 8/2004 | Moran ............ 74/490.04 |
| 2004/0189646 A1 | 9/2004 | Hayashi et al. |
| 2005/0270295 A1 | 12/2005 | Cohen et al. |
| 2006/0061574 A1* | 3/2006 | Ng-Thow-Hing et al. ... 345/473 |
| 2006/0087510 A1* | 4/2006 | Adamo-Villani et al. .... 345/474 |
| 2006/0262114 A1 | 11/2006 | Leprevost |
| 2006/0274070 A1* | 12/2006 | Herman et al. ............ 345/474 |
| 2008/0024487 A1 | 1/2008 | Isner et al. |
| 2008/0148157 A1* | 6/2008 | Kamdar et al. ............ 715/747 |
| 2008/0294285 A1* | 11/2008 | Shoham ............ 700/245 |

OTHER PUBLICATIONS

Davis, et al., "Informal Animation Sketching: Requirements and Design", *American Association for Artificial Intelligence*, Copyright © 2002, 7 pages.

De La Mora, et al., "Jabberwocky", *Thesis Previsualization, New York University, Center for Advanced Digital Applications*, Dec. 17, 2007, 84 pages.

Gascuel, Jean-Dominique, et al., "Displacement Constraints for Interactive Modeling and Animation of Articulated Structures", *The Visual Computer*, vol. 10, No. 4, Mar. 1994, pp. 191-204.

James, et al., "Skinning Mesh Animations", *ACM SIGGRAPH 2005 Papers (SIGGRAPH '05)*, Markus Gross (Ed.), Jul. 31-Aug. 4, 2005, ACM, New York, NY, pp. 399-407.

Love, "Volumetric Mesh Editor", *MSc Dissertation, University of Glasgow*, Sep. 2000, 65 pages.

Yam, "Using Macromedia Flash for Electronic Presentations: A New Alternative", American Journal of Roentgenology, AJR, 2006; vol. 187, pp. W209-W217.

Zhang, "Rendered Animated Scene and Its Application in Interactive Games", *The University of Edinburgh, School of Arts, Culture and Environment*, pp. 1-26, (2007).

Office Action dated Apr. 4, 2011 in U.S. Appl. No. 12/197,684.

Office Action dated Apr. 7, 2011 in U.S. Appl. No. 12/197,746.

Office Action dated Apr. 7, 2011 in U.S. Appl. No. 12/197,795.

Office Action dated Apr. 7, 2011 in U.S. Appl. No. 12/197,844.

Steve Capell, Seth Green, Brian Curless, Tom Duchamp and Zoran Popovic, Jul. 21-22, 2002, "A Multiresolution Framework for Dynamic Deformations", Proceedings of the 2002 ACM SIGGRAPH/Eurographics symposium on computer animation (SCA '02), ACM, New York, NY, USA pp. 41-47.

Chris Maraffi, "Softimage® XSITM Character Animation f/x & Design", © 2001, chapters 1, 4 and 5, Published by Coriolis Group Books (Dec. 18, 2000), 79 pages.

Rose, C.F., Sloan, P.P.J. and Cohen, M.F., Sep. 2001, "Artist-Directed Inverse-Kinematics Using Radial Basis Function Interpolation", Computer Graphics Forum, vol. 20, Issue 3, pp. 239-250.

Non Final Office Action in related U.S. Appl. No. 12/197,746 dated Nov. 9, 2011, 68 pages.

"Run-Time Skin Deformation," Jason Weber, Intel Architecture Labs.

U.S. Appl. No. 12/197,844, filed Aug. 25, 2008.

U.S. Appl. No. 12/197,795, filed Aug. 25, 2008.

U.S. Appl. No. 12/197,746, filed Aug. 25, 2008.

U.S. Appl. No. 12/197,684, filed Aug. 25, 2008.

Final Office Action dated Dec. 1, 2011 in related U.S. Appl. No. 12/197,795, 36 pages.

Non final Office Action in related U.S. Appl. No. 12/197,844 dated May 17, 2013, 21 pages.

Final Office Action in related U.S. Appl. No. 12/197,684 dated Jul. 25, 2013, 71 pages.

Smith, Jennifer and Smith, Christopher, "Adobe Creative Suite 3 Design Premium All-In-One Desk Reference for Dummies", Hoboken, NJ, Wiley Publishing, Inc., Aug. 6, 2007, 123 pages.

Peters, Keith, "Foundation ActionScript 3.0 Animation: Making Things Move!", Apress (Apr. 2007), specifically Chapters 6, 9-10 and 14, 101 pages.

Chadwick, J.E., Haumann, D.R. and Parent, R.E., "Layered Construction for Deormable Animated Characters", SIGGRAPH '89 Proceedings of 16th Annual Conference on Computer Graphics and Interactive Techniques, vol. 23, Issue 3, Jul. 1989, pp. 243-252.

Lee, Myeong Won and Lee, Min-Geun, "An Animation Toolkit Based on Motion Mapping", Proceedings of Computer Graphics Inernational, 2000, IEEE pp. 11-17.

Wiley, D.J. and Hahn, J.K., "Interpolation Synthesis of Articulated Figure Motion", Computer Graphics and Applications, IEEE, vol. 17, No. 6, pp. 39, 45, Nov./Dec. 1997.

Non Final Office Action in related U.S. Appl. No. 12/197,844, dated Sep. 28, 2012, 52 pages.

Final Office Action in related U.S. Appl. No. 12/197,746 dated Jul. 31, 2013, 21 pages.

\* cited by examiner

SYSTEMS AND METHODS FOR RUNTIME CONTROL OF HIERARCHICAL OBJECTS

FIELD

Embodiments relate generally to the field of computing and specifically to computing applications used to create, control, and otherwise use displayed objects.

BACKGROUND

Media often involves the display of animated or moving objects. For example, a media object may consist of a series of frames played one after another by a media player. The sequential playing of the frames gives the appearance of objects within the frames moving over time. Development of such media can involve painstakingly creating each object in each frame independently. For example, animating a car moving down a street may involve redrawing the street and the car in a different position on the street in each of a series of multiple frames. Certain techniques exist to help developers simplify this otherwise painstaking and repetitive process. Some development tools allow a developer to reuse elements of a previous frame in a subsequent frame. For example, a developer may need to draw the street and the car only once to create the frames of the previous example. After drawing the street and the car for a first frame, the developer can save these objects in a first frame and then use them as a basis for created subsequent frames. A development tool may, for example, allow the developer to simply reposition the car object and save the second frame, reposition the car again and save the third frame, etc. Another technique that can simplify the process of creating animation involves extrapolating between frames created by a developer. In the previous example, a developer may create a first frame with the car at one end of a street and a second frame with the car at a second end of the street. The development tool can use the first and second frames as end points to create additional frames for inclusion in the play sequence of frames. For example, the positions of the car in the end frames can be used to determine several intermediate positions of the car on the street for intermediate frames.

In spite of these and other powerful features, present authoring and media environments could improve with respect to facilitating the movement of more complicated objects. In particular, moving objects that have multiple, interrelated parts continue to present various challenges. One example, is the complexity involved in animating a person or figure waving his or her hand or picking up an object on the ground. The more complex the figure (i.e., the more parts it has), the more difficult this task is for the developer. In many cases, the developer will be required to redraw (or reposition) each component of the object, e.g., the hand, the forearm, the upper arm, the shoulder, the head, etc.

The movement of multi-part and other complicated objects has been facilitated by defining an object as a "hierarchical object." A "hierarchical object" is any object having at least some components to which a parent-child order has been ascribed (i.e., a first component is the parent of a second component, which is the parent of a third component, etc.). Just as a human figure/body is comprised of a plurality of bones, each bone being interconnected, and having a relationship with the adjacent bones, a hierarchical object can be considered to comprise a plurality of components that are also called "bones." In one aspect a bone may be visualized as a straight line, or alternatively the bone may be visualized or displayed as a shape. Each of these bones has a base point and a tip point, approximately at each end of the bone, respectively. For example, where a first bone is the parent of a second bone, the tip of the first bone may be "attached" to the base of the second bone. This "attachment" can be used by a development tool to coordinate movement of the object, i.e., when one bone moves the other bone will move to preserve the attachment.

In addition to bones, hierarchical objects may also comprise linked components that are linked (with respect to movement) to the bones of the hierarchy. For example, an outer shape or mesh may be defined based on the position of one or more of the bones. As a specific example, an outer shape may be drawn by a developer and include various control points on the shape. When a bone is moved, any control points associated with the moved bone will cause the shape to move and/or deform. In the case of the person figure example described above, some development tools have allowed a developer to draw, for example, outline shapes of a hand, forearm, upper, arm, shoulder, and the rest of the desired display components of a figure. The developer could then draw and associate a hierarchy of bones with these display components, so that movement of the hand outline shape causes the associated bone hierarchy to move, which then causes the other outline shapes to also move. For example, a single action by a developer moving the hand outline to a new position could automatically result in the repositioning of many (or all) of the other outlined components of the figure object, e.g., the forearm, upper arm, shoulder, hand, etc.

The use of hierarchical objects has been facilitated and/or enhanced with the use of kinematics techniques. For example, inverse kinematics have been used to reposition the bones of hierarchical objects based on a single movement created by a developer. Some development tools implement the kinematics techniques as algorithms executed behind the scenes, i.e., without direct user input or knowledge. Despite the advantages and benefits of using hierarchical object and kinematics techniques in the context of animating objects, many aspects of animation in computer-based media development continue to require significant user interaction.

SUMMARY

Methods for runtime control of the movement of objects are provided. Certain embodiments relate to creating and publishing a piece of media that includes an object that can be moved or otherwise controlled at runtime. Such an object may be a hierarchical object and control of the movement of such a hierarchical object may be facilitated using inverse kinematics procedures that allow complicated movements to be specified in simple ways. For example, an inverse kinematics procedure may move some or all of the many components of a hierarchical object based on a simple instruction to move a single part of the hierarchical object to another location. For example, a movement of a hierarchical object can be based on the identification of an end effector on the hierarchical object and an identification of a target location on the canvas area. An "end effector" is any point or part of an object that a developer, user, or application intends to move or use to control movement. A "target location" is any point or other location to which the developer, user, or application intends to move the end effector. In other words, specifying an end effector and a target location defines an intended movement, i.e., move that end effector to that target location. Because the positions of other components of a hierarchical object may be linked to or otherwise associated with the position of the end effector, those components of the hierarchical object may move as a result of an end effector being positioned at or nearer to the target location. In other words, by specifying an intended movement of one point or part of an object, a movement of the entire object may be specified, including movement of the individual components that comprise the object.

Thus, the movement of a hierarchical object may be controlled easily by a developer, user, or application specifying a movement by identifying a target location to which an end effector should move. In a hierarchical object representing a person, for example, a developer, user, or application may select a point on the figure's finger as an end effector and a position directly out in front of the figure (on the canvas) to move the finger. The method may cause the finger to move to the position and determine corresponding movements for other components of the figure object, including movement of the figures arm (e.g., extending towards the target location) and/or movement of the entire figure towards the end effector. These movements may be determined by calculating appropriate rotational and translational movements of components of the object that position the end effector nearer to the target location, e.g., as close as possible given any constraints placed on these movements.

One exemplary method comprises receiving, in a media content authoring environment, a hierarchical object comprising a first component object attached to a second component object. An inverse kinematics procedure is provided for controlling the movement of the first component object and the second component object in response to receiving variables identifying an end effector and target location. The method further comprises receiving, in the media content authoring environment, a command to provide to a runtime environment a piece of media comprising a runtime-determined movement of the hierarchical object. The runtime-determined movement is determined using the inverse kinematics procedure. The method further comprises providing the piece of media to the runtime environment. The piece of media includes the inverse kinematics procedure, which may move the hierarchical object at runtime, for example, by using a runtime variable to determine a movement for the hierarchical object comprising a movement of the first component object and a movement of the second component object. Such a runtime variable may be provided by a user of the piece of media or determined by the piece of media or another application, as examples.

In other embodiments, a computer-readable medium (such as, for example, random access memory or a computer disk) comprises code for carrying out the methods described herein.

These illustrative embodiments are mentioned not to limit or define the invention, but to provide examples to aid understanding thereof Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF EXEMPLARY EMBODIMENTS

Figure 1:
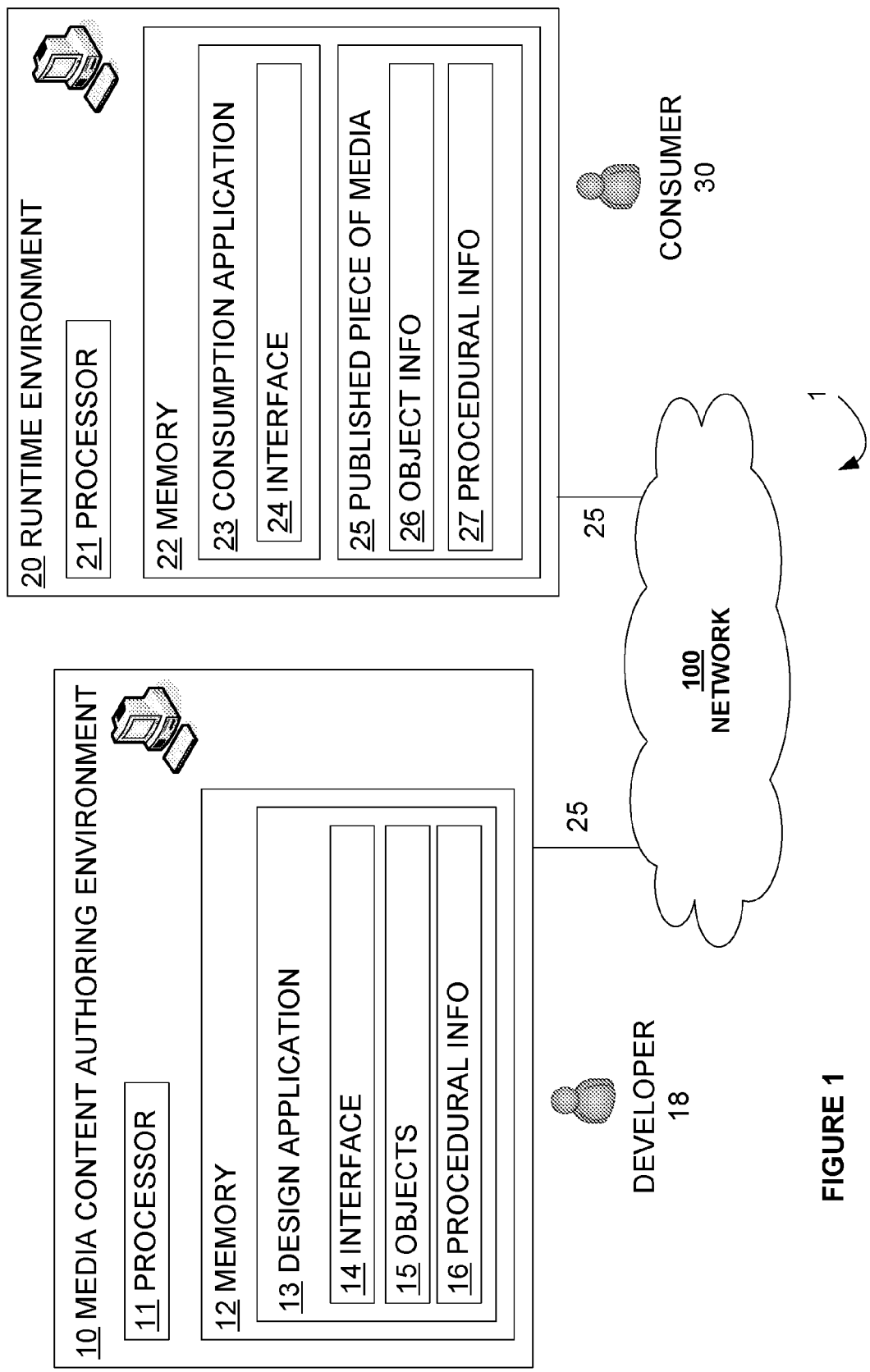
FIG. 1 is a system diagram illustrating a media content authoring environment and an exemplary runtime environment according to certain embodiments.

Methods for runtime control of hierarchical objects are provided. Certain embodiments provide a runtime environment that includes kinematics procedures. Making these procedures available in the runtime environment allows the variables of the kinematics procedures to be specified at runtime, for example by the end user or a runtime-executed script.

The use of forward and inverse kinematics techniques provides various benefits to media content, for example, by enabling the animation of hierarchical objects in computer-based media. "Forward kinematics" refers to moving a parent bone to affect child bone(s) (i.e., effects go down the hierarchy), while "inverse kinematics" refers to moving a child bone to affect parent bone(s) (i.e., up the hierarchy). Inverse kinematics may be used to facilitate the creation and/or control of animation in electronic media by allowing a developer (or user) to simply control a hierarchy object (such as an entire arm or an entire person figure), by simply moving one object (such as a hand bone). A specific example involves moving a figure's hand bone and having other bones (the forearm, upper arm, shoulder, neck, head, etc.) and the joint angles between each adjust. Attributes (e.g., bone length, bone position, joint degree of freedom, etc.) of the hierarchy can be specified or constrained so that the inverse-kinematics-controlled movement resembles movement of an actual person.

Runtime use of kinematics procedures can be controlled in various ways. For example, control of a hierarchical object may be based on identification of an end-effector and a target point. A user may be enabled to specify these at runtime, for example, by clicking on or otherwise selecting a shape, rigid form, bone, or other part of an object and then specifying a particular point as a target point. Another example of runtime control of a hierarchical object involves a script (for example one provided with a piece of media content) that runs at runtime and provides the end-effector, target point, and/or any other variables used to control the movement of the hierarchical object. For example, a script could move a target point around in a repeating circle. At runtime, the displayed hierarchical object will display the motion effected by this, i.e., the components of the hierarchical object may move in the sequence specified by the moving target point and this motion will be repeated so long as the script continues to repeat. Thus, if the object includes a forearm, upper arm, shoulder, neck, head, etc., a script could be written to move a target point such that the hand appears to be waving. The other components move along with the waving hand according to movement specified by inverse-kinematics procedures.

These illustrative examples are given to introduce the reader to the general subject matter discussed herein and are not intended to limit the scope of the disclosed concepts. The following sections describe various additional embodiments and examples of methods and systems for monitoring content consumption.

Illustrative Authoring and Runtime Environments

The following specific illustrative embodiment is provided to illustrate some of the applications, uses, and benefits of certain of the techniques described herein. Referring now to the drawings in which like numerals indicate like elements throughout the several Figures, FIG. 1 is a system diagram illustrating a media content authoring environment and an exemplary runtime environment according to certain embodiments. Other embodiments may be utilized.

The system 1 shown in FIG. 1 comprises a media content authoring environment 10, which may, for example, include a computing device that comprises a processor 11 and a memory 12. A developer 18 uses the media content authoring environment 10 to author media content. The memory 12 may comprise a design application 13 with an interface 14 that the developer 18 uses for such authoring. The interface 14 may provide a graphical design area or canvas area upon which the developer 18 may place, position, and otherwise define objects that will be a part of a piece of media that is being developed. Information about such objects may be stored in memory 12.

The design application 13 may allow the developer 18 to create and use hierarchical objects, for example, by allowing the developer 18 to position components on a graphical design area and create and revise relationships between components of a hierarchical object.

The design application 13 may further allow the developer 18 to perform procedures on objects of the piece of media being developed, including performing kinematics procedures. Thus, a developer 18 may specify a two bone hierarchical component and then specify an end-effector and target point for a kinematics-based movement. The design application 12 comprises procedural information 16 for carrying out these kinematics and other procedures within the design application 13, for example, by displaying the movement on a graphical design area.

The design application 13 may also allow a developer 18 to develop or otherwise use scripts that will control objects within a piece of media content that is being developed, including script that will be used to control a hierarchical object at runtime, for example, by specifying variable values at runtime that will control the object. For example, a script may implement a particular series of movements for a hierarchical object. At runtime, when the script is executed, the script provides the variables needed to implement the desired movements.

Once the developer is ready to publish a piece of media to a runtime environment, the design application 18 generates a piece of media 25. The piece of media 25 may be used by another application on the developer's computing device or sent to another location, for example, through a network 100 to a runtime environment 20. The runtime environment may also include a processor 21 and a memory 22. The memory 22 will generally include a consumption application 23 that provides an interface 24 for viewing or otherwise consuming pieces of media. The piece of media 25 may be stored in memory 22 and viewed or otherwise consumed by a consumer 30 using the interface 24 of the consumption application 23.

The piece of media may allow runtime control of a hierarchical object. This can be accomplished in various ways including by providing both object information 26 and procedural information 27. The procedural information may include the logic necessary to perform procedures (including kinematics procedures) that utilize information provided in the runtime environment (including information from the user and information from runtime-executed scripts).

The procedural information 27 may or may not be the same procedural information 16 available in the media content authoring environment 10. For example, the procedural information 16 and procedural information 27 may be the same procedural classes. Thus, certain embodiments enable runtime control of kinematics by including some or all of the procedures used in development in the piece of media for use at runtime. Conversely, it should be recognized that there may be various advantages to using procedures in a development environment that are capable of being packaged in or with a piece of media for use in the runtime environment. For example, among other things, utilizing the same procedural classes may simplify development, testing, and debugging of a piece of media content.

Illustrative Media Object Comprising a User Controlled Hierarchical Object

Figure 2B:
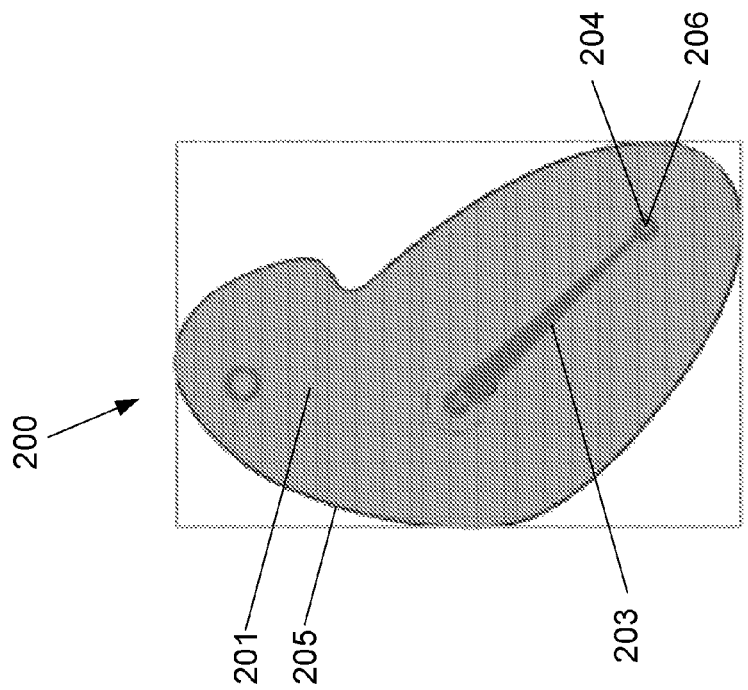
FIGS. 2a-b illustrate an exemplary hierarchical object displayed on a user interface according to certain embodiments.
Figure 2A:
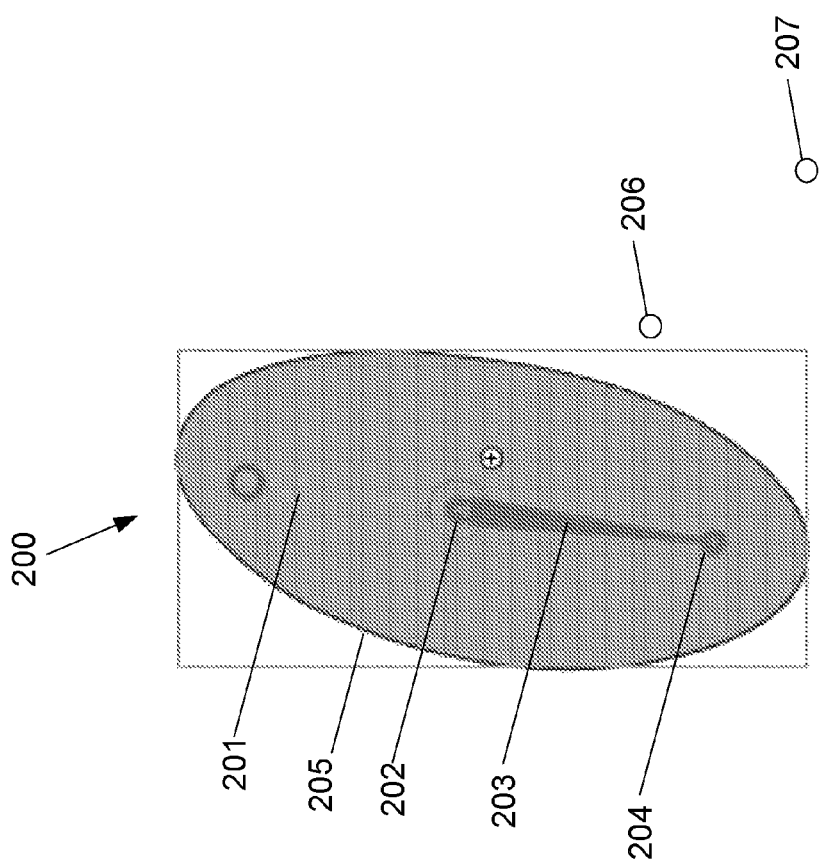

FIGS. 2a-b illustrate an exemplary hierarchical object 200 that could be displayed and manipulated on a user interface according to certain embodiments. The object 200 comprises a first bone 201 coupled to a second bone 203 at a joint 202. The first bone 201 has been defined as the parent of the second bone 203 making bone 203 a potential end-effector for the combined hierarchical object 200. The hierarchical object 200 further comprises a shape 205 that has been defined based on the position of the bones 201, 203, e.g. the location of each point of the shape's perimeter is determined based on the location of one or more of the bones 201, 203.

FIG. 2a illustrates a selection of a target point 206 as a desired position for the end effector bone 203. Upon selection of the target point, inverse kinematics procedures are employed using the identity of the end-effector bone 203 and the location of the target point 206. New positions for the bones 201, 203 are determined and a new perimeter for the shape 205 is determined based on the new positions of the bones 201, 203. In some cases, less than all of the bones in a hierarchical object will need to move to accomplish the inverse-kinematics-based procedure. For example, bone 201 may not need to move.

In certain embodiments, the target point is specified by a developer developing a piece of media content, for example, while defining animation for an object. In other embodiments, the end user or consumer is able to specify the target point and thus utilize inverse kinematics and other procedures at runtime. The inverse kinematics procedures used may be any of those known in the art, including, but not limited to those discussed in Weber, J., Run-Time Skin Deformation, Intel Architecture Labs, 2000, incorporated herein by this reference.

Whether controlled by a developer, user, or based on information from a runtime or other script, the location of the target point can be determined in any suitable manner, including smart techniques that identify the closest potential target point to another selected point. For example, a user may position the cursor or otherwise select a desired point 207 to which it is impossible to move the end-effector, e.g., where the point is simply too far away from the object and the object's lateral position is fixed. However, the interface may recognize the desired point 207 and calculate and use the closest potential target point, e.g., which might be target point 206 depending on the constraints placed on the hierarchical object 200. This smart functionality may improve the ease with which movement of hierarchical objects can be controlled by a cursor because the user need not identify a precise point but rather can create movement by identifying points anywhere in an intended direction of movement.

While the movement shown in FIGS. 2a and 2b is from one position to a second position, the movement may be displayed as continuous. Moreover, movement may be displayed as a user moves a cursor position around so that the movement of the hierarchical object appears to track the developer's cursor's movement. A development application can record information about such movements to be replayed at runtime.

Alternatively, the runtime application may allow tracking based on control of a hierarchical object such that the movement of the hierarchical object appears to track the user's cursor's movement. A runtime user or consumer may thus be able to continuously control the movement of a hierarchical object in a runtime environment. For example, in a game application, a game character may be defined as a hierarchical object (for example, including various bones and a shape forming a character and an attached sword) that is controlled by the user's actions (for example, providing information about the movement of the sword). The position of the character's body (based on the position of the bones of the body) may move in response to the user's desired movement for the sword. In other words, as the user provides information about the sword's movement, inverse kinematics procedures calculate appropriate changes for the character's position. The user may provide the sword position information by any suitable means including, but not limited to, using a keyboard, mouse, voice interpreter, light-pen, joystick, game controller, and/or any other device, including devices that translate a real world two or three dimensional position of the device to a position within the runtime environment.

In certain embodiments, an authoring application is provided that allows a developer to define hierarchical objects and then select whether or not the user will be able to control the movement of the hierarchical object, e.g., whether or not to allow tracking of the user's cursor to control movement of a hierarchical object.

Illustrative Adobe® Flash® Embodiment

In one exemplary embodiment an Adobe® Flash® authoring tool is used to generate a .swf movie that includes kinematics functionality embedded in the .swf movie itself The developer may include in a .swf a runtime script that produces information (e.g., kinematics variables) that are used by embedded kinematics functionality. Alternatively or in addition, when the movie is published or otherwise provided to a runtime environment, the consumer may be able to use a runtime application to interact with the .swf movie and control the kinematics-based animation using the kinematics functionality embedded in the .swf movie. Since the .swf file contains the necessary procedural information, the Flash® player itself need not contain any of the logic or procedures used to implement the kinematics-based movements.

The Flash® authoring tool may implement this functionality, for example, by recognizing that a hierarchical object is included in a piece of media content, locating Actionscript® classes used to define the kinematics functions, and embedding code into the resulting movie. The .swf file may also include information about the hierarchical objects themselves, including their positions, relationships, and constraints (e.g., angular limitations, etc.) Constraints may be used both to define a hierarchical object so that its movements are realistic (i.e., the character's movements do not exceed what a real person could achieve) and to restrict what a user can do (e.g., in the game example, the sword may not go above shoulder height until the user achieves a certain achievement level, etc.)

When a .swf file is executed, a player may recognize that kinematics procedural classes have been provided. The player may implement the classes so that the classes are called when needed during runtime by the hierarchical object or objects in the movie, e.g., when the user specifies a new target point for a particular object. The user may be unaware that kinematics functions are being used to facilitate their control of an object. The implementation of these classes may involve building conceptual data structures used to implement kinematics procedures.

To implement inverse kinematics functions, a runtime application may take the geometric information provided by available kinematics techniques and convert the results into pixel positions on a screen or other display. Similarly, the user specifying one or more target points may involve a conversion from pixel position to an X and Y position that is usable by the kinematics techniques.

Figure 3:
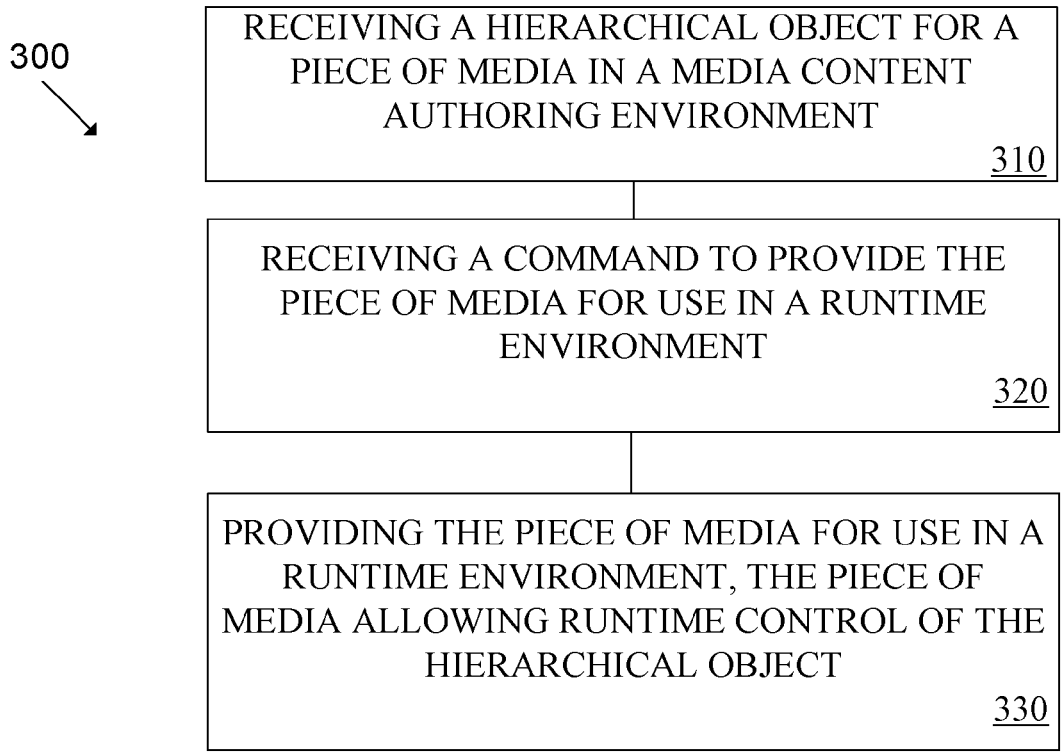
FIG. 3 is a flow chart illustrating an exemplary method of providing, to a runtime environment, a piece of media comprising a hierarchical object, according to certain embodiments.

Illustrative Method of Providing Runtime Control of a Hierarchical Object in a Piece of Media FIG. 3 is a flow chart illustrating an exemplary method 300 of providing, to a runtime environment, a piece of media comprising a hierarchical object, according to certain embodiments. For purposes of illustration only, the elements of this method 300 may be described with reference to the system depicted in FIG. 1. A variety of other implementations are also possible.

The method 300 may be computer-implemented. The method 300 comprises receiving a hierarchical object for a piece of media in a media content authoring environment, as shown in block 310. This may involve receiving information about component objects and one or more relationships between the component objects. These component objects may, as examples, comprise one or more bones, shapes, and/or symbols. The information about component objects may, as examples, comprise information connecting shape control points to the bones that provide boundary information for a spline shape, constraint information (angular limits, translation limits), and/or any other relevant information.

An example of receiving a hierarchical object for a piece of media in a media content authoring environment can involve a system such as the system illustrated in FIG. 1. As one example, the media content authoring environment 10 could receive in the interface 14 of a design application 13 one or more inputs from a developer 18 specifying the location of two related bones: a parent bone connected to a child bone. The interface 14 may also receive, for example, a constraint from the developer 18 specifying that the angle between the bones shall not be less than 45 degrees. As another example, the developer 18 may further specify that a shape will surround the two bones by drawing a shape around the bones and identifying that the position of the shape perimeter will be associated with one or both of the two bones.

Referring again to FIG. 3, in addition to receiving a hierarchical object for a piece of media, the method 300 further comprises receiving a command to provide, for use in a runtime environment, the piece of media, as shown in block 320. The user may have selected to allow, not allow, or selectively allow control of hierarchical objects, for example, by indicating that a hierarchical object's movement can be controlled by cursor tracking.

The method 300 further comprises providing the piece of media for use in a runtime environment, the piece of media offering runtime control of the hierarchical object, as shown in block 330. The piece of media may comprise object information and kinematics procedural information. The object information may comprise information about the hierarchical object and the kinematics procedural information may comprise information for performing kinematics on the hierarchical object. The object information may have a declarative format (e.g., XML) and the kinematics procedural information may have a script-based format, may relate to forward kinematics procedural information, and/or may relate to inverse kinematics procedural information.

With respect to FIG. 1, the command to provide the piece of media for use in a runtime environment may be received by the interface 14 of the design application 13 on the media content authoring environment 10. For example, the developer 18 may mouse click on a publish button that allows the developer 18 to specify a file location, such as a location on a remote hosting server, to which the published application may be sent.

Once the publish command has been executed, the media content is packaged to include the object and procedural information and sent to the exemplary remote hosting server (e.g., located somewhere on network 100). From there, the published piece of media 25 is available for use in one or more runtime environments, such as in runtime environment 20 on consumption application 23. The published piece of media 25 may, for example, be downloaded and stored in the memory 22 at the runtime environment and from there executed by the consumption application 23.

Figure 4:
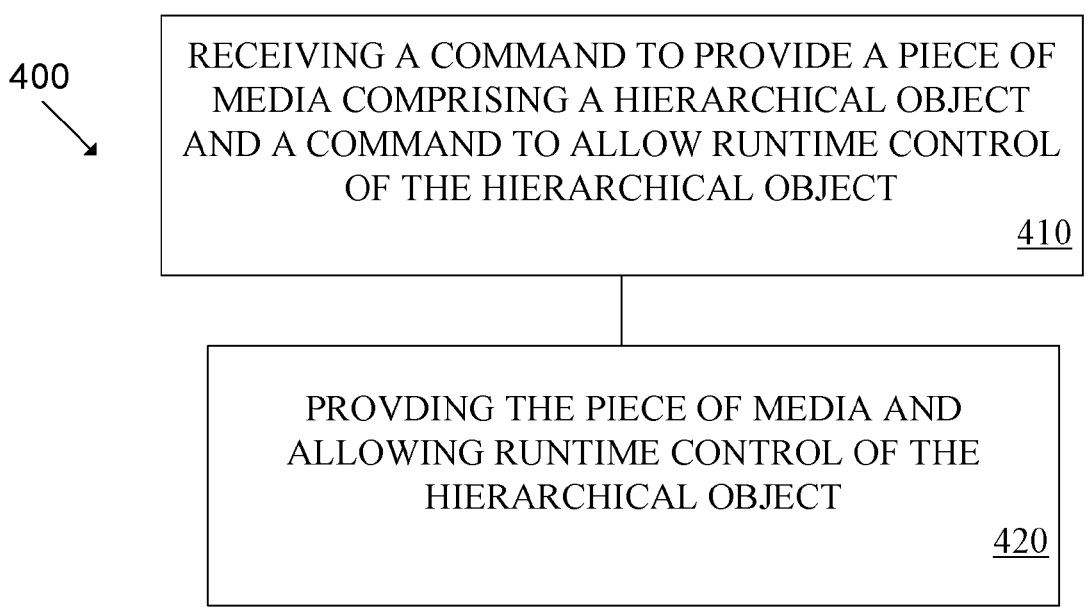
FIG. 4 is a flow chart illustrating another exemplary method of providing a piece of media comprising a hierarchical object, according to certain embodiments.

Illustrative Method of Selectively Allowing Runtime Control of Hierarchical Objects in a Piece of Media FIG. 4 is a flow chart illustrating another exemplary method 400 of providing a piece of media comprising a hierarchical object according to certain embodiments. For purposes of illustration only, the elements of this method 300 may be described with reference to the system depicted in FIG. 1. A variety of other implementations are also possible.

The method 400 may be computer-implemented. The method comprises receiving a command to provide a piece of media comprising a hierarchical object and a command to allow runtime control of the hierarchical object, as shown in block 410. The command to provide and the command to allow runtime control may be a single command or may be separate commands. These commands are received in a media content authoring environment.

With respect to FIG. 1, the commands to provide a piece of media comprising a hierarchical object and to allow runtime control of the hierarchical object may be received by the interface 14 of the design application 13 on the media content authoring environment 10. For example, the developer 18 may mouse click a checkbox on the interface 14 indicating that runtime control of the hierarchical object is allowed and then click on a publish button that allows the developer 18 to specify a file location, such as a location on a remote hosting server, to which the published application may be sent.

Referring again to FIG. 4, the method 400 also comprises providing the piece of media and allowing runtime control (e.g., runtime control of kinematics) for the hierarchical object, as shown in block 420. The media may be provided to a runtime environment, such as runtime environment 20 shown in FIG. 1. The piece of media may comprise object information and kinematics procedural information. The kinematics procedural information may comprise information for building one or more data structures at runtime to perform kinematics on the hierarchical object. The runtime kinematics for the hierarchical object may be controlled by one or more variables received on a user/consumer interface when the piece of media is executed. Such variables may specify, as examples, one or more end-effectors and/or one or more target points. The variables may, among other things, be identified based on user action or may be generated during execution of a runtime-executed script.

General

Certain embodiments relate to inverse kinematics. These are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

What is claimed is:

1. A computer-implemented method, comprising:
receiving, in a media content authoring environment, a hierarchical object comprising a first component object attached to a second component object, wherein an inverse kinematics procedure is provided to move the first component object and to move the second component object in order to position an end effector on the hierarchical object nearer to a target location, the inverse kinematics procedure moving the first component object and the second component object in response to receiving variables identifying the end effector and the target location;
receiving, in the media content authoring environment, a command to provide to a runtime environment a piece of media comprising a runtime-determined movement of the hierarchical object, the runtime-determined movement determined using the inverse kinematics procedure; and
providing the piece of media for consumption by a consumption application in the runtime environment separate from the media content authoring environment, wherein the piece of media comprises the inverse kinematics procedure, wherein the inverse kinematics procedure uses both an authoring environment variable specified in the media content authoring environment and a runtime variable separately specified at runtime to determine a movement for the hierarchical object comprising a movement of the first component object and a movement of the second component object, and wherein the consumption application does not comprise the inverse kinematics procedure.

2. The method of claim 1, wherein the runtime variable identifies the end effector on the hierarchical object.

3. The method of claim 1, wherein the runtime variable identifies the target location.

4. The method of claim 1, wherein the hierarchical object comprises bones used to control the movement of the hierarchical object and shapes used to display appearance attributes of the hierarchical object.

5. The method of claim 4, wherein a shape is a spline shape comprising control points, the control points providing boundary information for the spline shape, the position of each control point determined using the position of one or more of the bones.

6. The method of claim 1, wherein the hierarchical object comprises bones used to control the movement of the hierarchical object and rigid bodies used to display un-deformable appearance attributes of the hierarchical object, the rotation of a rigid body determined using the position of one or more of the bones.

7. The method of claim 1, wherein the hierarchical object comprises constraint information constraining the relative positions of the first component object and the second component object.

8. The method of claim 7, wherein the constraint information comprises an angular limit.

9. The method of claim 7, wherein the constraint information comprises a translation limitation.

10. The method of claim 1, wherein the piece of media comprises the kinematics procedural information in a script-based format.

11. The method of claim 1, wherein the piece of media comprises declarative statements defining component objects of the hierarchical object.

12. The method of claim 11, wherein the declarative statements have an XML (Extensible Markup Language) format.

13. A computer-implemented method, comprising:
receiving, in a media content authoring environment, a command to provide to a runtime environment a piece of media comprising a runtime-determined movement of a hierarchical object, the runtime-determined movement determined using the inverse kinematics procedure to move component objects of the hierarchical object in order to position an end effector on the hierarchical object nearer to a target location, the inverse kinematics procedure moving the component objects in response to receiving a variable identifying the end effector and the target location; and
providing the piece of media for consumption by a consumption application in the runtime environment separate from the media content authoring environment, wherein the piece of media comprises the inverse kinematics procedure, wherein the inverse kinematics procedure uses both an authoring environment variable specified in the media content authoring environment and a runtime variable separately specified at runtime to determine a movement for the hierarchical object, and wherein the consumption application does not comprise the inverse kinematics procedure.

14. The method of claim 13 further comprising receiving, in the media content authoring environment, a command to allow runtime control of the hierarchical object.

15. The method of claim 13, wherein the runtime variable specifies the end-effector.

16. The method of claim 13, wherein the runtime variable specifies the target location.

17. The method of claim 13, wherein the runtime variable is received from a runtime executed script.

18. The method of claim 13, wherein the runtime variable is determined based on runtime input received from a user of the piece of media.

19. A system comprising:
a processor;
a memory comprising a program instructions; wherein the program instructions are executable to provide:
an interface for receiving a hierarchical object for a piece of media in a media content authoring environment, the hierarchical object comprising a first component object attached to a second component object, wherein an inverse kinematics procedure is provided to move the first component object and to move the second component object in order to position an end effector on the hierarchical object nearer to a target location, the inverse kinematics procedure moving the first component object and the second component object in response to receiving variables identifying the end effector and the target location; and
a providing engine for receiving a command to provide the piece of media to a runtime environment separate from the media content authoring environment and providing, for consumption by a consumption application in the runtime environment, the piece of media comprising a runtime-determined movement of the hierarchical object, the runtime-determined movement determined using the inverse kinematics procedure, wherein the piece of media comprises the inverse kinematics procedure, wherein the inverse kinematics procedure uses both an authoring environment variable specified in the media content authoring environment and a runtime variable separately specified at runtime to determine a movement for the hierarchical object comprising a movement of the first component object and a movement of the second component object, and wherein the consumption application does not comprise the inverse kinematics procedure.

20. A non-transitory computer-readable medium on which is encoded program code, the program code comprising:

program code for receiving a hierarchical object comprising a first component object attached to a second component object, wherein an inverse kinematics procedure is provided to move the first component object and to move the second component object in order to position an end effector on the hierarchical object nearer to a target location, the inverse kinematics procedure moving the first component object and the second component object in response to receiving variables identifying the end effector and the target location;

program code for receiving a command to provide to a runtime environment separate from a media content authoring environment a piece of media comprising a runtime-determined movement of the hierarchical object, the runtime-determined movement determined using the inverse kinematics procedure; and program code for providing the piece of media for consumption by a consumption application in the runtime environment, wherein the piece of media comprises the inverse kinematics procedure, wherein the inverse kinematics procedure uses both an authoring environment variable specified in the media content authoring environment and a runtime variable separately specified at runtime to determine a movement for the hierarchical object comprising a movement of the first component object and a movement of the second component object, and wherein the consumption application does not comprise the inverse kinematics procedure.

21. A non-transitory computer-readable medium on which is encoded program code, the program code comprising:

program code for receiving a command to provide to a runtime environment separate from a media content authoring environment a piece of media comprising a runtime-determined movement of a hierarchical object, the runtime-determined movement determined using the inverse kinematics procedure to move component objects of the hierarchical object in order to position an end effector on the hierarchical object nearer to a target location, the inverse kinematics procedure moving the component objects in response to receiving a variable identifying the end effector and the target location; and program code for providing the piece of media for consumption by a consumption application in the runtime environment, wherein the piece of media comprises the inverse kinematics procedure, wherein the inverse kinematics procedure uses both an authoring environment variable specified in the media content authoring environment and a runtime variable separately specified at runtime to determine a movement for the hierarchical object, and wherein the consumption application does not comprise the inverse kinematics procedure.

22. The method of claim 1 wherein the consumption application is a player and the piece of media is a movie.

* * * * *